Patented July 26, 1927.

1,636,951

UNITED STATES PATENT OFFICE.

HARRY CAMPBELL, OF MARINERS HARBOR, NEW YORK, ASSIGNOR OF TWENTY-FIVE PER CENT TO ROGER THOMPSON BUTTS, TWENTY PER CENT TO ERNEST WILSON BUTTS, AND TWENTY PER CENT TO ROBERT STARR ALLYN, ALL OF NEW YORK, N. Y.

PIPE VALVE.

Application filed June 1, 1923. Serial No. 642,853.

Figure 1:
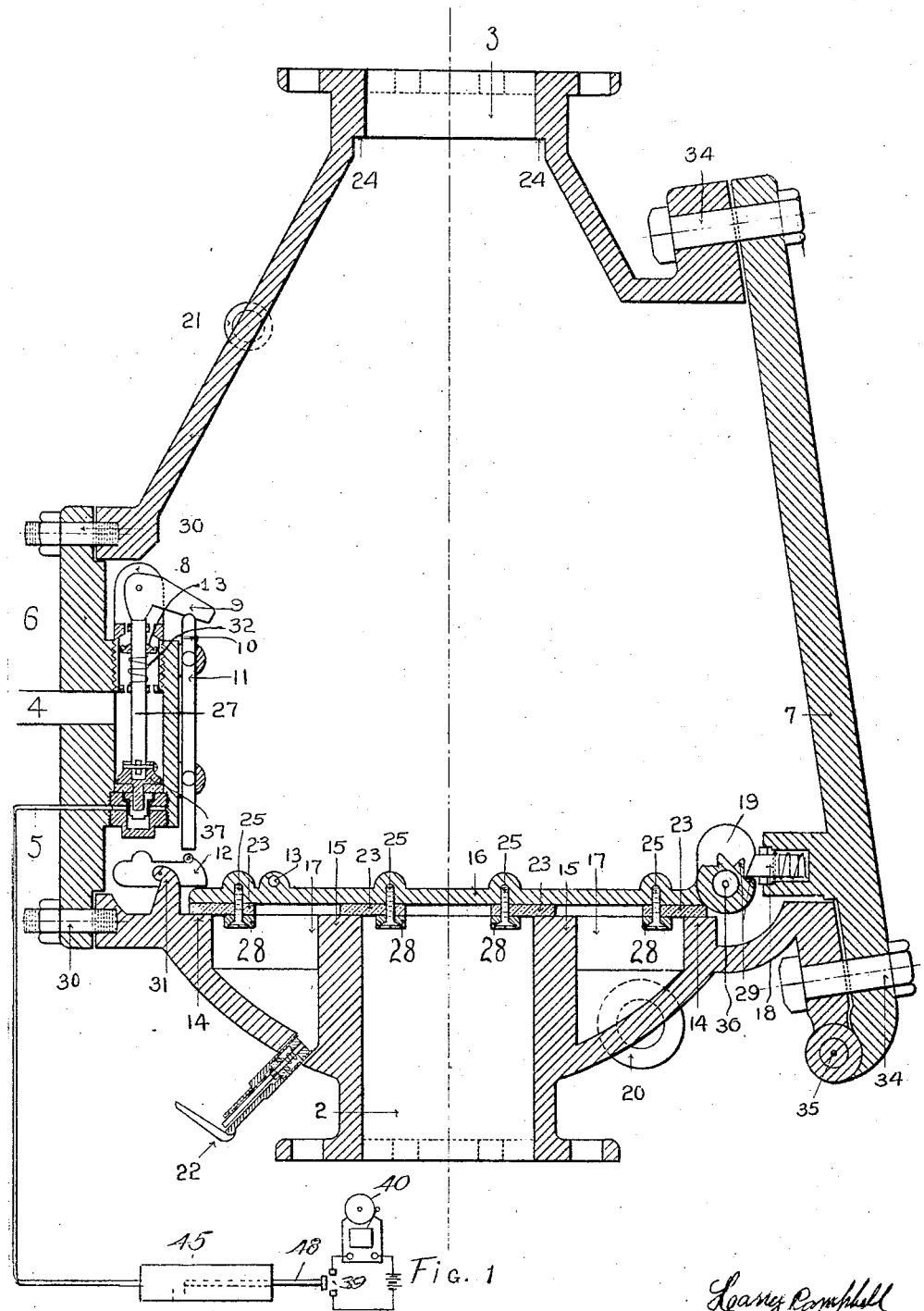
Figure 2:
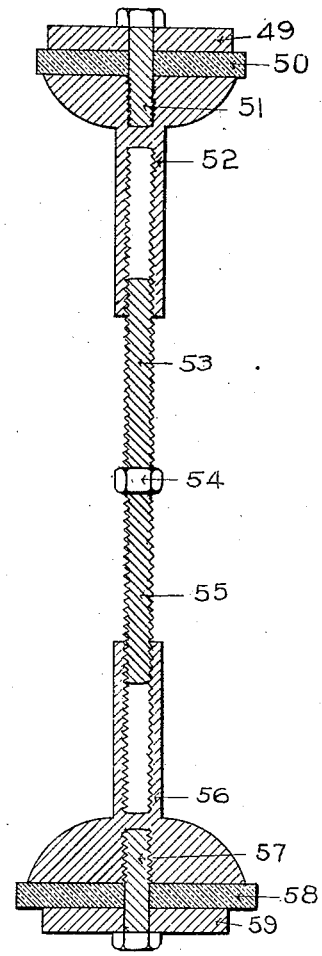
Figure 3:
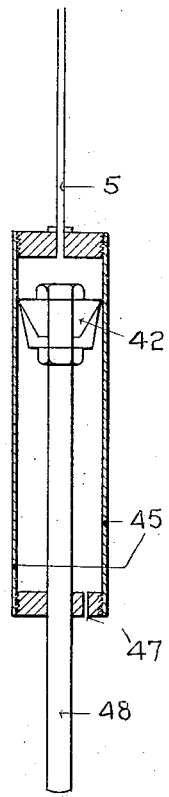

This invention is designed mainly for use in automatically operating water sprinkler systems for the extinguishing of fire and whereof, accompanying this petition, are three drawings i. e. a vertical longitudinal sectional drawing Fig. 1; a sectional drawing of the test valve Fig. 2; and a sectional drawing Fig. 3 of the alarm valve and the following is a description.

The invention covers a dry pipe valve of relatively simple and economic construction which will be compact, efficient and easily assembled providing for such automatically operating parts as are necessary.

One object is to provide a construction having a combined water and air valve with means for automatically shutting off the air pressure from the main valve chamber and water line when the water valve opens.

Another object is to shut off the air supply from the casing in case the water valve is once opened in such a way that the air pressure cannot be again applied without first inspecting the water valve.

Another object is to automatically give an alarm when the water valve opens and discontinue the air pressure from the water line.

A further object of the invention is to provide a means for automatically giving the alarm which is positive in its action and which will only permit of the alarm being discontinued by the shutting off of the air supply from the compressor.

The body 1 of the casing has a water inlet 2 at the bottom and an outlet 3 at the top. Air pressure is applied from any suitable source to the casing through the air inlet 4. Pipe 5 leads to an alarm operator 45. The sides of the casing have openings which are normally closed by covers 6 and 7 respectively. The air valve seat 14 and water valve seat 15 are in the same plane and normally closed by the main valve 16 which is hinged at 36. Gasket rings 23, 23 may be provided as is customary. Such rings may be held in place by rings 28 and screws 25.

A catch chamber 17 is located between seats 14 and 15 and provided with a connection 20 for the usual main drain valve (not shown). The upper part of the casing is provided with a connection 21 for the usual air test valve (not shown). The pressure of air or water in the chamber 17 may be determined by opening a self closing test valve 22.

The valve 16 is normally held closed by its weight plus the pressure of air in the casing 1, the air pressure and weight being sufficient to overcome the pressure of water in the inlet 2. When the air pressure fails the water pressure raises the valve 16. The spring pressed latch 18 carried by the cover plate 7 engages the teeth 29 on the valve and holds the valve open. The counterweight 19 on the valve 16 near its hinge 36 assists in the opening action of the valve.

The cover plate 7 is held in place by bolts 34 and hinged at 35. When once the valve 16 has opened it can only be closed by opening the cover 7 so as to release the latch bolt 18.

The cover 6 is held in place by bolts 30. This cover 6 carries air valve mechanism which controls an alarm device 45. An air valve member having a stem 27 is mounted in a chamber formed in the inner wall of the cover 6. Its valve 37 is normally held closed by the cam surface of toggle lever 9 which is hinged to the lug 8 and opposes the spring 32. The rod 11 which is mounted to slide in a guide way in the cover 6 is suspended by the pin 10 just beneath the horizontal arm of the lever 9. The lower end of the rod 11 is located just over one end of the rocker lever or pawl 12 which is pivoted on the lug 31 alongside of the outer edge of the valve 16. The rocker projects over the edge of the valve so as to be actuated by the valve in its opening movement.

The valve 38 on the upper end of the stem 27 is normally open but when the air pressure decreases so as to release the main valve 16 the rocker 12 is tilted so as to lift the rod 11 and thus move the lever 9. The spring 32 then lifts the stem 27 and closes the valve 38 to cut off access of air pressure from pipe 4 to the main chamber. The same movement opens the valve 37 so that air pressure from pipe 4 may pass through pipe 5 to actuate alarm device 45 until the air pressure is shut off.

The alarm device (Fig. 3) has a plunger 42 actuated by air pressure from the pipe 5. This plunger has a rod 48 which carries a switch member adapted to engage contacts 39 in the circuit of an alarm bell or buzzer 40. The cylinder 45 has an air inlet 47 to permit the plunger 42 to move.

The test member shown in Fig. 2 has two end pieces 52 and 56 with sockets threaded to receive the opposite ends of a rod having a right hand thread on the end 53 and a left hand thread on the end 55. An angular enlargement or nut 54 is provided to afford a wrench hold for turning the threaded rod and thus moving the end pieces 52 and 56 toward or away from each other. Soft rubber washers 50 and 58 are held on the opposite ends by screws 51 and 57 and washers 49 and 59 respectively. The washers 50 and 58 are adapted to fit respectively in the seats 24 and 15 when the valve 16 is open.

When the test valve device is adjusted in place the main valve body 1 is completely shut off from both the upper and lower parts of the system and we can test the various parts independently thus positively locating leaks.

When the parts are in the normal position of Fig. 1 it is assumed that the outlet 3 and the usual overhead system of pipes and sprinklers (not shown) are all under air pressure which holds the valve 16 closed. The opening of one or more sprinklers releases air from the system more rapidly than it is supplied through valve 38 so that the water pressure quickly overcomes the air pressure and opens the valve 16. The latch 18 holds the valve open and prevents it from knocking on the water column.

As the valve 16 opens it throws rocker 12, lifts rod 11, and releases cam lever 9. Spring 32 then closes air valve 38 and opens air valve 37 and diverts the air pressure from pipe 4 through pipe 5 to the alarm device 45.

To reset the valve after it has been tripped, the water is shut off below the valve 16 by means of the usual gate valve or other acceptable type of valve. The overhead system is then drained through the main outlet connection 20. The cover plate 7 is then unbolted and swung open on the hinge 35 and the valve 16 swung out of the casing over on top of the cover 7. The test valve of Fig. 2 may be inserted and the system tested for leaks.

When everything is found all right the valve 16 is swung into place and the rocker 12 and rod 11 set and the air valves 37 and 38 reset by means of the cam lever 9. In the larger sizes the valve 16 may have an eye or recess 13 to provide a seat for a rope or tackle to lower the valve in place.

The cover 7 is then closed and fastened in position and the air pressure applied as before through pipe 4. When the air pressure reaches the desired amount as determined by suitable gages or from test connection 21 the valve in the water supply line is slightly opened and the desired water pressure applied.

I claim—

1. A dry pipe valve comprising a casing having a water inlet at the bottom and a water outlet at the top, a water valve hinged in the casing for said inlet, said casing having openings on opposite sides, a cover plate for one of said side openings to permit access to said water valve, a cover plate for the opposite side opening, an air supply valve carried by said latter cover plate normally admitting air pressure on top of said water valve and means actuated by the opening of the water valve to close said air supply valve.

2. A dry pipe valve comprising a casing having a water inlet and a water outlet, an air closed water valve for the inlet, means for admitting air pressure to said casing above said water valve, a compressed air operated device connected to said casing above said water valve, valve means for shutting off the air pressure from the casing and diverting the air to the compressed air operated device, a cam for normally holding said valve means in one position and means for moving said cam actuated by said water valve.

3. A dry pipe valve comprising a casing having a water inlet and a water outlet, a water valve for said inlet, an air valve for supplying air pressure on top of said water valve and means actuated by said water valve to shut off the air supply to the casing when the water valve opens.

4. A dry pipe valve comprising a casing having a water inlet, a water outlet and an air inlet, a water valve for normally closing the water inlet, a normally open air valve adapted to close said air inlet, means controlled by the opening movement of said water valve for closing said air valve, an alarm device and means controlled by the movement of said air valve for actuating said alarm device when said water valve opens.

5. In a dry pipe valve, a casing, a single combined air and water valve, an alarm device actuated by compressed air, means for admitting air under pressure above said water valve and a valve device for simultaneously shutting off air to said casing and admitting it to said alarm device.

6. A dry pipe valve comprising a casing, a combined air and water valve therein, a spring pressed valve within said casing normally admitting air to said casing above said combined air and water valve, a cam lever normally holding said spring pressed valve open, means actuated by said combined air and water valve for actuating said lever and permitting said spring pressed valve to close when said air and water valve opens.

7. A dry pipe valve comprising a casing, a water valve therein, a valve for admitting air under pressure to said casing to normally hold the water valve closed, a cam for holding said air valve open, independently of the water valve, means actuated by the water valve for moving said cam to release said air valve and means for closing the air valve when released.

8. A dry pipe valve comprising a casing having a water valve and an air supply valve and an air alarm valve and means of connection between said valves whereby said air alarm valve is opened when said water valve opens and air supply to said casing is shut off at the same time.

9. A dry pipe valve construction comprising a casing, a water valve operable therein, an air supply valve for admitting air under pressure on top of said water valve, a cam and spring for controlling the position of said air supply valve, a pawl operated by the opening of said water valve and a connecting rod for transmitting motion from said pawl to said cam to shut off air supply to said casing.

10. A dry pipe valve comprising a casing having a water inlet in its lower part and an outlet in the upper part, a water valve for the inlet, normally held closed by air pressure in the casing, an alarm valve, a cam normally holding said alarm valve closed, means actuated by the water valve for disengaging said cam from said alarm valve, and a spring for actuating said alarm valve when said cam is disengaged.

11. A dry pipe valve comprising a casing having a water inlet and a water outlet, a water valve for said inlet, an air supply valve mounted in one side of said casing normally opened to admit air under pressure into said casing above said water valve and means for automatically closing said air supply valve when said water valve opens.

12. A dry pipe valve comprising a casing having a water inlet at the bottom and a water outlet at the top, a valve hinged in one side of said casing normally closing said water inlet, a latch bolt carried by one side of the casing and adapted to coact with the hinged part of said water valve and a pawl coacting with the opposite edge of said water valve and a spring pressed supply valve adapted to be released by said pawl to shut off the supply of air pressure to said casing when the water valve trips the pawl.

13. A dry pipe valve comprising a casing having a water inlet, a water outlet and a side opening, a cover plate for said side opening having an air inlet and an air outlet, an air valve member carried by said plate normally closing the air outlet and leaving the air inlet open, a pivoted main water valve for the water inlet normally held closed by air pressure within the casing, and means actuated by the opening of the main water valve for moving the air valve member to close the air inlet and open the air outlet when the water valve opens.

HARRY CAMPBELL.